United States Patent [19]

Grace, Jr.

[11] 4,409,015

[45] Oct. 11, 1983

[54] FLOWABLE LIQUID FERTILIZER CONTAINING SUSPENDED WATER INSOLUBLE NITROGEN

[75] Inventor: Thomas T. Grace, Jr., Lanesville, Ind.

[73] Assignee: Borden, Inc., Columbus, Ohio

[21] Appl. No.: 348,040

[22] Filed: Feb. 11, 1982

[51] Int. Cl.$^3$ .............................................. C05C 9/00
[52] U.S. Cl. ...................................... 71/28; 71/64.08; 564/44; 564/63; 564/73
[58] Field of Search ........................ 564/32, 44, 62, 63, 564/73; 71/27–30, 64.08, 64.09, 64.1

[56] References Cited

U.S. PATENT DOCUMENTS

| | | | |
|---|---|---|---|
| 2,467,212 | 4/1949 | Kvalnes | 71/28 X |
| 2,729,611 | 1/1956 | Chesley, Jr. et al. | 71/28 X |
| 3,462,256 | 8/1969 | Justice et al. | 71/28 |
| 3,970,625 | 7/1976 | Moore et al. | 260/29.4 R |
| 4,234,332 | 11/1980 | Michaud et al. | 71/64.1 X |
| 4,298,512 | 11/1981 | Sartoretto et al. | 260/29.4 R |
| 4,318,729 | 3/1982 | Coury | 71/29 |

*Primary Examiner*—Ferris H. Lander
*Attorney, Agent, or Firm*—Robbins & Laramie

[57] ABSTRACT

A two stage process for preparing an aqueous dispersion of a urea-formaldehyde condensation product comprising: in a first stage, reacting together formaldehyde and urea in a molar ratio of formaldehyde to urea in the ratio from about 2.5 to 1 to about 4.7 to 1 in the presence of a condensation catalyst until the methanol tolerance is in a range such that the condensate is clear and will remain clear, substantially free from precipitated reaction material, upon storage for one year at room temperature, to form an intermediate reaction product, then in a second stage, reacting said intermediate reaction product with an additional amount of urea such that the overall molar ratio of urea to formaldehyde is in the range from 0.8 to 1 to about 1.7 to 1, at an acid pH and at an elevated temperature not above about 70°C., until the amount of water insoluble nitrogen present in the reaction mixture is in the range from about 15% to about 35% based on the total amount of nitrogen in the system.

32 Claims, No Drawings

FLOWABLE LIQUID FERTILIZER CONTAINING SUSPENDED WATER INSOLUBLE NITROGEN

BACKGROUND OF THE INVENTION

This invention relates to aqueous dispersions of particles of urea-aldehyde condensation products, which are useful as fertilizers, and to processes for preparing them.

Urea is commonly used as a source of nitrogen in fertilizers. It contains 46% by weight of available nitrogen, in readily water-soluble form. Because of its solubility, urea is often used in the form of prills, which are small globules of solidified molten urea, since the prills have a slow dissolution rate. However, in whatever form urea per se is commonly used, it is generally considered to be a quick release fertilizer. That is, its ready solubility means that it is carried into the soil rather quickly, and since it is in soluble form, it is absorbed rapidly by plant life.

Often today, fertilizers are formulated to release plant nutrients over a period of time, for more uniform effect on the plant life and to avoid the burning that sometimes occurs when too much fertilizer material is applied and becomes available within a very short space of time. To this end, urea has been applied to the soil in the form of urea-formaldehyde compositions. Because the urea is chemically bound, it releases nitrogen in available form, in which it can be assimilated by plant life, much less rapidly than urea per se.

The nitrogen in urea-formaldehyde fertilizer products is ordinarily characterized as: (1) soluble nitrogen, which may be derived from uncombined urea or other nitrogenous materials; (2) cold water insoluble nitrogen (CWIN); and (3) hot water insoluble nitrogen (HWIN). These latter two are generally referred to as water insoluble nitrogen (WIN). The methods for the determination of WIN, and the proportions thereof that are, respectively, CWIN and HWIN, are reported in the publication, *Official Methods of Analysis of the Association of Official Agricultural Chemists*, 11th Edition, 1970.

Liquid forms of urea-formaldehyde fertilizers, that can be applied by spraying, are commonly used by those offering commercial lawn care services. Often the formulations preferred by such commercial organizations provide a combination of a quick release nitrogen source, which may be urea, or a water-soluble urea-formaldehyde reaction product, for example, and a slow release nitrogen source, which generally is a water-insoluble urea-formaldehyde condensation product. Sources of phosphorus and potassium often are included in such formulations. Typically the formulation that is intended for application to park and residential lawns will provide for a sustained release of nitrogen during a period up to about 90 days. For other applications, such as the maintenance of turf areas on golf courses, longer sustained release periods may be preferred.

The production of a water-soluble urea-formaldehyde reaction product, suitable for fertilizer use, is described in U.S. Pat. No. 3,462,256. The product has less "burn" potential than urea, but is much more likely to "burn" than products produced in accordance with the present invention. The process comprises preparing an aqueous mixture of urea and formaldehyde having a urea:formaldehyde mol ratio above 1:1 but less than 2:1, adding ammonia in an amount of 0.3% to 6% by weight of the urea and formaldehyde, heating the mixture at a temperature between about 75° C. and boiling while maintaining the pH of the mixture in the range of about 8.5 to 10 with strong alkali until at least about 90% of the formaldehyde is in combined form, with at least 60% of the formaldehyde in the form of methylol compounds, and then continuing heating at pH 7 to 8.5 until at least 50%, but no more than 80%, of the formaldehyde is in the form of methylene groups.

The aqueous mixture of urea, formaldehyde and ammonia can be prepared from the individual components, i.e., a commercially available formaldehyde solution and urea in any convenient form. However, it can also be prepared by adding urea to an already partially condensed urea formaldehyde reaction product such as UF Concentrate 85 prepared in accordance with U.S. Pat. No. 2,652,377 and the term "aqueous mixture" mentioned above is meant to include mixtures prepared in this manner.

The Sartoretto et al. U.S. Pat. No. 4,298,512, also describes aqueous dispersions of urea-aldehyde polymers for use as liquid fertilizers. The urea-aldehyde polymers are primarily produced by the condensation of urea with formaldehyde, and the aldehyde content is modified by the inclusion in the reaction mixture of one or more alkyl aldehydes having from two to four carbon atoms. The nitrogen concentration in the dispersions described in the patent is generally on the order of from about 15% to about 17% by weight based on the total dispersion.

In the process of the Sartoretto patent, the formaldehyde source was generally either a water clear solution containing 60% formaldehyde and 25% urea by weight, referred to in the trade as a UFC-85 concentrate, or an aqueous formaldehyde stabilized with methanol and containing 37% formaldehyde by weight. A UFC-85 concentrate is a weakly reacted material. To prepare it, urea and formaldehyde are reacted together under mildly alkaline conditions in a manner similar to that described in U.S. Pat. No. 3,970,625. At the conclusion of the brief reaction period, the reaction product is concentrated to a high solids content of 85% by weight, hence the name, UFC-85. The product contains 60% formaldehyde by weight, 25% urea by weight (F/U molar ratio, 4.8 to 1), and a balance consisting of the aqueous vehicle. UFC-85 can also be made by continuous processes, such as, for example, by dissolving highly concentrated formaldehyde vapors, from a formaldehyde manufacturing process, in an aqueous solution of urea.

The 2-4 carbon alkyl aldehydes used in the Sartoretto patent as stabilizing reactants, that is, acetaldehyde, propionaldehyde, and butyraldehyde, are difficult materials to store and handle. Acetaldehyde, for example, has to be stored under refrigerated conditions and preferably under an atmosphere of nitrogen gas.

The reaction of urea and formaldehyde to form a stable dispersion of WIN particles is tricky because of the reactivity of these materials under acidic conditions. The reaction is exothermic and rapidly accelerates at elevated temperatures. The danger of run-away reactions resulting in a non-flowable or pasty condition is high. The use of a pre-reaction product, such as UFC-85, mitigates this reactivity to some extent.

Those skilled in the art of fertilizer manufacture are well aware of these and other problems concerning reaction control. The reaction is extremely sensitive, for example, to minor pH changes, which strongly influence the degree of precipitation of water insoluble nitrogen (WIN) particles. The pH also changes during the reaction—dropping initially and then rising as the reaction progresses. It is therefore very difficult to keep the reaction conditions constant and to exert any degree of accurate control over the reaction rate or the way in which the reaction progresses. Furthermore, there is no easily run test that can be used to determine the way in which the reaction is progressing. Control of the reaction therefore tends to be somewhat crude, relying upon time and temperature observations.

Since the urea-aldehyde condensation product that is formed during the reaction is insoluble in the aqueous vehicle, particles of the condensation product precipitate out. For optimum slow release, these particles should grow to be sufficiently large to be more aptly termed granules. If the reaction mixture is agitated, the particles tend to remain very fine in size. This in turn may result in an increase of viscosity as the reaction progresses.

Since the reaction goes forward at an elevated temperature, under either acid or alkaline conditions, although much more rapidly under acid conditions, the reaction must be stopped somehow, at some desired point, before a solid gel or an unworkable mass is formed by the reaction. Ordinarily, the reaction is stopped by cooling to ambient temperature and by adjusting the pH to neutral. Even so, the reaction may continue very slowly. Continuation of the reaction is extremely undesirable. For example, the liquid fertilizer composition may be placed in a storage tank, and if permitted to stand there for several weeks, may slowly gel in the tank to the point where it no longer flows.

The term "stability", as applied to a liquid fertilizer materials based on urea-formaldehyde condensation products, refers to the maintenance of the material in a readily flowable state. Stability is adversely affected when the WIN is present in very fine particle size, and also when the total amount of WIN particles present is below about 10% or above about 35% by weight based on the total nitrogen present.

The Michaud et al. U.S. Pat. No. 4,234,332, describes the use of dicyandiamide in an aqueous solution useful as a fertilizer. The presence of the dicyandiamide is said to enhance the solubility of nutrient materials present, improve stability against precipitation of ingredients from solution, and to inhibit nitrification after application of the fertilizer solution to the soil.

SUMMARY OF THE INVENTION

I have now found that many of these difficulties can be overcome by the use of a two stage process for the manufacture of the flowable liquid urea-formaldehyde fertilizer composition. In the first stage, what I will refer to hereafter as an intermediate reaction product is prepared.

The first stage of the two stage reaction produces an intermediate reaction product at an F/U molar ratio of 2.5–4.5. This intermediate preferably is made under alkaline conditions to methylolate the urea, followed by acid condensation to an end point determined by solubility in methanol. This methanol tolerance is a measure of the degree of reaction of the intermediate. Although viscosity could be used as a measure of degree of reaction (polymer growth), determination of accurate viscosities is time consuming and not as accurate as the methanol tolerance at the low viscosity levels of these products. The intermediate can also be made under completely acid conditions.

In more detail, in the preferred mode for the first stage, a mixture is made of formaldehyde and urea at a molar ratio of formaldehyde to urea (F/U) of from about 2.5 to 1 to about 4.5 to 1, and preferably, from about 3 to 1 to about 3.5 to 1. This mixture is reacted in the presence of an alkaline catalyst to methylolate the urea, then further reacted in the presence of an acid catalyst at a pH in the range from about 3.5 to about 5.5, and preferably, from about 4.0 to about 4.5. The reaction temperature is generally in the range from about 60° C. up to reflux temperature, which is at about 103° C. The preferred operating temperature range for the reaction is from about 70° C. to about 90° C.

The reaction is controlled by time and temperature, and also by observing the progress of the reaction through the characteristics of the reaction product, by taking periodic samples. The product is completely water soluble, and accordingly, samples are evaluated for methanol tolerance as the reaction progresses. The reaction is considered adequate when the methanol tolerance is in the range from about 150% to about 800%, but preferably is in the range from about 200% to about 600%, that is, when one volume of the product will tolerate from two to six parts of methanol, before clouding.

In the second stage, this intermediate condensation product is then itself reacted with an additional amount of urea to form an aqueous dispersion that is useful as a base material for formulating liquid fertilizers. The amount of urea used is such that the overall molar ratio of urea to formaldehyde is in the range from 0.8 to 1 about 1.7 to 1. Preferred range 1.3 to 1 to 1.6 to 1. This reaction is carried out at an acid pH and at an elevated temperature not shown above about 70° C., and preferably not above about 60° C. The reaction is continued until the amount of WIN present in the reaction mixture is in the range from about 15% to about 35% based on the total amount of nitrogen in the system. In addition to urea, other nitrogenous materials may be present. Such materials include, for example, dicyandiamide, which is reactive with aldehydes and thus exerts a stabilizing effect on the final product, as well as contributes to the nitrogen content.

When the second stage reaction product is used as a base material for formulation, it may be fortified with other desirable components, such as, for example, sources of potash, phosphorus and trace minerals. Certain of these materials ordinarily are considered to exert a destabilizing effect. The formulations of the present invention are very tolerant of them, however. The formulations preferably include gum stabilizers such as, for example, xanthan gum either alone or in combination with guar or locust bean gum. These are particularly desirable when any destabilizing material is added during formulation.

DETAILED DESCRIPTION OF THE INVENTION

The flowable liquid fertilizer materials of the present invention may be prepared in large scale production equipment, such as is employed by companies that manufacture urea-formaldehyde resin.

Such equipment generally includes reaction vessels of substantial capacity, in the range from about 6,000 gallons to about 16,000 gallons. Such a vessel is ordinarily equipped with an external side arm heat exchanger, or with an internal pitched-blade impeller, or with both. A large scale reaction vessel, that is equipped with only an impeller agitator, generally employs internal tube bundles for heat exchange. Often a sampling pump is provided for removing samples when the vessel is being operated under reduced pressure.

A reaction vessel equipped with an external heat exchanger typically will employ a centrifuged pump for recirculating the reaction mixture, that is, for moving the reaction mixture from the bottom of the vessel, moving it through the heat exchanger, and returning it to the top of the vessel, at a rate of several thousand gallons per minute. The action of the pump subjects the reaction mixture to high shear. There may also be baffles along the internal wall of the vessel to induce currents in the reaction mixture in a direction counter to the flow produced by the action of the impeller blade. The effect of this agitation on the water soluble materials present in the reaction mixture, such as urea-formaldehyde condensation products, is to produce a very rapid distribution in the reaction mixture of these soluble materials, and in addition, other additives present such as catalysts, neutralizing agents, and reactants.

Product stability of such liquid fertilizer material in general is adversely affected by a high degree of agitation, since that tends to result in the production of very fine particles in the urea-formaldehyde condensation product. Low shear agitation permits the achievement of high WIN levels before the reaction has proceeded for enough so that the viscosity of the reaction mixture becomes a problem.

The present invention employs two stages of reaction for the production of a flowable liquid material for use as a fertilizer, in order to produce a material that is characterized by enhanced stability. In the second stage moderate agitation is desired. Since each reaction vessel tends to have its own particular characteristics of fluid flow under agitation, generalized recommendations as to agitation are difficult to make.

The objective of the use of two stages is considered to be that of lowering the activity of formaldehyde present, both in the second stage of reaction, and in the final, fully formulated product, for better stability during storage, transportation, and application. The low level of formaldehyde activity is particularly important in the final product, to permit storage of the fertilizer composition for time periods in excess of three months during the application season, for example, without having the composition turn into an immovable gel. I have found that the deactivation of the formaldehyde through the use of acid condensed intermediates in the F/U molar range of 2.5 to 1, to 4.5 to 1, significantly increases the liquid life of this type product. I have found that stabilizers such as dicyandiamide are helpful, particularly when used in conjunction with alkaline-methylolated, acid condensed, or completely acid condensed first stage intermediate reaction products. I have also found that the stabilizing effect of these intermediates allows much greater control of the reaction and permits the attachment of both higher WIN levels and higher total nitrogen levels without the loss of viscosity stability.

I have also found that a combination of locust bean or guar gum with xanthan gum provides good suspension of WIN particles at lower total gum levels. This is attributed to the effect of the combination of gums in forming a weak, thermally reversible gel; thus, the particles are suspended in a medium of apparent high viscosity. The yield value of this medium is such that it remains fluid when subjected to agitation such as mixing or pumping, or even mild agitation, such as pouring from a container.

The First Stage—Production of the Intermediate

The first stage involves the preparation of an intermediate urea formaldehyde condensation product. According to a preferred mode, the formaldehyde and urea are mixed together in a reaction vessel at a molar ratio of formaldehyde to urea in the range from about 2.5 to 1 to about 4.5 to 1. More formaldehyde proportionately is deactivated when the molar ratio of formaldehyde to urea has a relatively low value. However, when the ratio approaches 2.5 to 1, the proportions of formaldehyde to urea approach those commonly employed for the production of urea-formaldehyde resins. This would limit the stability of the intermediate and deactivate the formaldehyde to such an extent that attainment of the desired WIN level, in the second reaction stage, would be extremely difficult. It is therefore best to operate at some F/U ratio above 2.5. Partly for this reason, the F/U molar ratio preferably is in the range from about 3 to about 3.5.

In a typical preferred intermediate production operation, the reaction is conducted initially at a basic pH to cause the methylolation of the urea, at a reaction temperature of about 80° C. This preliminary reaction is carried on for about 30 minutes, then the pH is adjusted to the acid side. While the pH value may be in the range from about 3.5 to about 5.5, values in the range from about 4.0 to about 4.5 are preferred. The temperature of the reaction may be brought up slowly to a threshold value of about 60° C., but preferably, the reactants and the reaction vessel are preheated so that when the components are brought together, the reaction mixture is heated rapidly, if necessary, to at least 60° C. The reaction temperature may be in the range from about 60° C. up to reflux, which generally is slightly above 100° C. The preferred reaction temperature, however, is in the range from 70° C. to about 90° C., to facilitate reaction control.

The reaction temperature is maintained for a sufficient time at the acidic pH, with periodic testing, until the reaction product exhibits a methanol tolerance of about 600% or less. At that point, the reaction is deemed to be adequate, and the reaction mixture is neutralized and cooled.

The typical intermediate produced in accordance with this procedure is a very stable material and will remain clear and fluid for more than one year at temperatures in the range from about 50° F. to about 90° F. (10° C.–32° C.).

An alternate procedure for the production of the intermediate, which can be employed, by-passes the alkaline methylolation entirely. This procedure uses the natural acidity of the formaldehyde (expressed as formic acid) to catalyze the reaction. This process requires the gradual or incremental addition of urea to the formaldehyde with the latter at a pH of 3.0–4.0 and preferably 3.5. Too rapid addition of urea may result in localized gelation or possible precipitation due to the formation of water insoluble fractions.

Gradual addition of urea allows the reaction to progress such that the reaction species formed at high F/U molar ratios stabilizes the reaction mass and in turn prevents precipitation as the molar ratio of F to U drops toward 3.5 or whatever final ratio is desired. This technique results in rapid reaction thus conserving valuable reaction equipment time and conserving energy. There is a minor disadvantage in that the material must be reacted to a lower percent methanol tolerance than the alkaline/acid reacted material in order to maintain intermediate clarity.

The Second Stage-Production of a Base From Which A Flowable Liquid Urea Formaldehyde Fertilizer Can be Formulated In the second stage of the process, the intermediate is reacted with urea. The amount of urea generally is sufficient so that the final molar ratio of urea to aldehyde is in the range from about 0.8 to 1 to about 1.7 to 1, and preferably, in the range from about 1.4–1.7 to 1. Expressing the same thing in a slightly different manner, the amount of urea employed is generally selected so that the total nitrogen content of the reaction mixture produced from the second stage is in the range from about 15% to about 18% by weight, and preferably, in the range from about 16% to 16.5%.

In a typical demonstration of a second stage reaction, the pH is adjusted to about 3.6 and the reaction mixture is rapidly brought to a temperature of 60° C. and held 30 minutes. Generally the temperature should not exceed 60° C. Alternately, the mixture can be allowed to rise in temperature gradually to the 45°–50° C. range and held for approximately 1 hour. This latter procedure will result in lower HWIN levels and higher activity indexes. Also external heat need not be applied since sufficient heat is generated exothermically by the reaction itself, thus saving energy.

To enhance the stability of the reaction mixture produced by the second stage reaction, and for other reasons, other materials than urea may be present as reactants. Such materials include, for example, dicyandiamide in an amount up to 5% by weight based on total solids, which contributes nitrogen and which is reactive with aldehyde groups present. Also, aqueous formaldehyde at a concentration in the range from about 37% to about 55% may be used as a second stage reactant, in an amount up to 50 mol % of the total mols of formaldehyde used in the second stage.

The second stage reaction is carried on to the point where the WIN level in the second stage reaction product is in the range from about 15% to about 35% of total nitrogen present, and preferably, from about 20% to about 30%. Generally the total nitrogen content of the second stage reaction product should be in the range from about 15% to about 18% by weight based on the entire second stage reaction product.

Also, the second stage reaction should be carried out in such fashion that the hot water insoluble nitrogen (HWIN) in the second stage is limited so that the Activity Index (A.I.), as hereafter defined, is in the range from about 50 to about 95, and preferably from about 65 to about 85. Preferred range 60–75.

The Final Formulation

The flowable fertilizer formulation, in its final form, is prepared from the second stage reaction mixture after neutralization of the reaction mixture. While the reaction mixture may be used as is, an additional amount of urea may be added to increase the nitrogen content to fall within the range from about 18% to about 21% by weight, which level is more acceptable to present commercial applicators of such fertilizer formulations to lawns. In addition to gum, or a mixture of gums, other plant nutrient materials may be added.

When a gum is used in formulating the final fertilizer product, some discrimination must be employed, depending upon the other types of materials added. A combination of locust bean gum and xanthan gum, or a combination of guar gum and xanthan gum, works well, for systems employing only nitrogen. However, if salts of phosphorus and potassium are added, the viscosity of the system generally tends to drop. This drop is viscosity results in what may be termed syneresis, which is manifested by the formation of two separate layers within the product, after standing a few days. The particulate matter settles in the lower layer, forming a relatively clear upper layer.

Often this difficulty or characteristic can be overcome in NPK-containing systems by using a combination of a relatively high level of (underivatized) guar gum with xanthan gum. This particular combination does not produce the same thickening effect that other gum combinations would tend to, so that a higher total gum level can be employed, which in turn appears to resist more successfully the thinning effect of the presence of PK materials such as, for example, ammonium polyphosphate, diammonium phosphate, and potassium chloride. Nevertheless, this particular gum combination functions to stabilize the system in a fashion that appears to be superior to that obtained when the individual gums are used separately.

General Comments on the Process

One problem that is associated with the large scale manufacture of materials of this type is that of control of the temperature during the reaction. With the process of the present invention, this would particularly apply to the second stage reaction. The reaction between formaldehyde and urea is exothermic. The heat generated, however, may be insufficient to raise the temperature to the desired threshold value of 60° C., within the span of times during which it is desirable to complete the reaction. Furthermore, gradual heating is desirable since it tends to favor the production of CWIN as opposed to HWIN.

The activity index (A.I.) is a measure of how fast the water insoluble nitrogen nitrifies in the soil. The larger the number, the faster the rate of nitrification. The A.I. is equal to $$\frac{(\% \ WIN - \% \ HWIN) \times 100}{\% \ WIN}.$$

The expressions "% WIN" and "% HWIN" refer to the respective percentages that those materials represent of the total nitrogen present. Thus a product with 20% WIN and 6% HWIN would have an A.I. of $$\frac{(20-6) \times 100}{20} = 70.$$

I have found that the two stage process of the present invention produces products in which low levels of WIN will not result in an unstable condition. In addition, I have also found that the reaction temperature in the second stage need not exceed 50° C., to generate high WIN levels, that is, up to 30% or more based on total nitrogen present, while nevertheless limiting the HWIN values in such fashion that the A.I.'s are commonly in the range from about 65 to about 90. Both the high WIN levels and the high A.I.'s are desirable for the lawn treatment industry.

Moreover, the heat required for the second stage reaction of the present invention can be generated by the exotherm itself. This permits the second stage to be carried out in vessels with external heat exchangers, since the circulating centrifugal pump need not be activated during the reaction process.

The reaction products produced by the second stage reaction have little tendency to exhibit an increase in viscosity during the manufacturing process, even under high shear conditions. However, the application of excessive shear during the second stage reaction, over a long period of time, has a detrimental effect on stability and therefore high shear should be avoided.

It is theorized that the use of the first stage reaction product or intermediate, in accordance with the present invention, partially deactivates the formaldehyde, and in addition, controls the structure of the reaction product produced during the second stage reaction to lessen the chance for the development of a paste-like consistency or a highly thixotropic state.

The invention will now be described in greater detail in the following specific demonstrations thereof. In these examples and elsewhere throughout the specification, all references to temperatures are in degrees Fahrenheit or Celsius, as indicated, and all parts and percentages are by weight, unless expressly stated to be otherwise.

EXAMPLE 1

Manufacture of an Intermediate Reaction Product; F/U 3.5:1

This example illustrates the preparation of an intermediate reaction product at an alkaline pH and at a molar ratio of formaldehyde to urea (F/U ratio) of 3.5 to 1. This demonstration was conducted on a laboratory scale.

Formaldehyde, 50% aqueous, 3600 gms. or 60 moles, was charged to a 5 liter flask. The pH was adjusted to 8.6 with 3.2 grams of 50% sodium hydroxide, then urea, 1028.6 grams or 17.14 moles, was charged to the flask. The temperature was then raised to 80° C. and held 30 minutes while maintaining the pH above 7.3 with sodium hydroxide. The pH was then adjusted to 4.6 with 8.0 grams of 10% sulfuric acid, and the temperature was held at 76° C. until a methanol tolerance of about 600% was observed (6 volumes of methanol to 1 volume of resin to result in a cloudy material). This required 1 hour and 25 minutes. The batch was neutralized to pH 6.8 with 50% sodium hydroxide and cooled.

The intermediate reaction product thus produced had the following physical properties:

| pH | 6.8 |
|---|---|
| Specific Gravity 25/25° C. | 1.220 |
| Brookfield Viscosity LVF 1/60/25° C. | 17 cps |
| Methanol Tolerance | 580% |

This intermediate will remain clear, with little viscosity change, for more than 1 year at 50° F. to 90° F.

EXAMPLE 2

Comparison Example

A. Production of an Intermediate at an F/U Molar Ratio of 5.0, Cooked Under Alkaline Then Acid Conditions To a 5 liter, 3 neck flask was charged 4200 grams of 50% formaldehyde and 3.4 grams of 50% sodium hydroxide to adjust to pH 8.5. Urea, 840 grams, was then charged and the batch was heated to 80° C. After a 30 minute 80° C. hold period the pH was adjusted to 4.1 with 6 grams of 10% sulfuric acid. Fifty minutes later the degree of reaction as measured by percent acetone tolerance was 700%. Twenty five minutes later the acetone tolerance was 650% and the batch was neutralized to pH 6.9 with 1.9 grams of 50% sodium hydroxide.

Physical properties were as follows:

| pH | 6.9 |
|---|---|
| Specific Gravity 25/25° C. | 1.203 |
| Brookfield Viscosity LVF 1/60/25° C. | 12.5 cps |
| % Acetone Tolerance | 650% |
| % Methanol Tolerance | Infinity |
| Buffer Capacity | 6.4 |

The high F/U ratio precludes the use of a methanol tolerance endpoint due to the influence of the high ratio in inhibiting further reaction. The use of this intermediate results in the production of second stage reaction products having unsatisfactory storage stability.

B. Production of an Intermediate at an F/U Molar Ratio of 3.0, Cooked Under Alkaline Then Acid Conditions This example illustrates the manufacture of an alkaline/acid cooked intermediate at an F/U molar ratio of 3.0. To a 5 liter, 3 neck reaction flask was charged 4000 grams of 50% formaldehyde (66.67 mols). The pH was adjusted to 8.3 with 3 grams of 50% sodium hydroxide. Urea, 1333 grams or 22.22 mols, was charged. After the urea had dissolved the pH was 8.7 and heat was applied to raise the temperature to 80° C.

After 30 minutes at 80° C. the pH had dropped to 7.4 and 15 grams of 10% sulfuric was added to adjust to pH 4.1. After 1 hour at 80° C. the methanol tolerance dropped to 250%. The batch was cooled and adjusted to pH 6.8 with 50% sodium hydroxide. The material had the following properties:

| pH | 6.8 |
|---|---|
| Brookfield Viscosity LVF 1/60/25° C. | 27 cps |
| Specific Gravity 25/25° C. | 1.230 |
| % Methanol Tolerance | 250 |
| Buffer Capacity* pH 9.0-2.0. | 7.5 mls |

*The buffer capacity of a material is a measure of its resistance to changes in pH with the addition of acid or alkali. Typically, enough material is used to result in 74 grams of formaldehyde. Since this material had 37.31% formaldehyde, 198.3 grams of intermediate was used. To this was added 1.7 grams H₂O to result in 200 grams of solution. The pH was adjusted to 9.0 with N/2 sodium hydroxide and then titrated to pH 2.0 with N/2 hydrochloric acid. The mls of acid required was 7.5.

When used to produce a second stage reaction product according to the invention, this intermediate permitted the production of stable products.

EXAMPLE 3

Preparation of Flowable Liquid Urea Formaldehyde Fertilizer

This demonstration of the invention was also conducted on a laboratory scale. A 3 liter flask was charged with 730.9 grams of urea and 1034.7 grams of water. Then, 689.8 grams of an intermediate reaction product, produced as described in Example 1 to a 500% methanol tolerance, were added. The pH was adjusted to 3.6 by adding 8.6 grams of 10% sulfuric acid. The reaction mixture was then heated to 60° C. and held at that temperature for 30 minutes. During this time, the pH dropped initially to 3.4, then rose to 3.8. At the end of the holding period at 60° C., the reaction mixture was neutralized, and 133.7 grams of urea were added.

The urea-enchanced reaction product thus obtained was divided into two approximately equal parts, A and B. Part A was subjected to analysis as is. Part B was placed under vacuum and heated to concentrate it to achieve a nitrogen content of 21% by weight of the total weight of Part B.

Both Parts were adjusted to 180 cps by adding xanthan gum. The characteristics observed are reported below:

|        | A    | B  |
|--------|------|----|
| % N    | 18.0 | 21 |
| % WIN  | 23.5 |    |
| % HWIN | 12.8 |    |
| A.I.   | 45.5 |    |

Part B was fluid for 10 weeks versus Part A which had risen in viscosity from 180 to 320 cps over a 5.5 month period. This example illustrates the stabilizing effect of the use of the intermediate.

EXAMPLE 4

Two Additional Demonstrations of the Production of Flowable Liquid Urea Formaldehyde Fertilizer, Based on the Use of Condensed Intermediates The following demonstrations of the invention make use of intermediates produced by the condensation of urea with formaldehyde at different molar ratios of formaldehyde to urea.

A. Use of an F/U 3.0 Acid Condensed Intermediate

An intermediate reaction product was prepared by reacting 50% formaldehyde with urea at a molar ratio of formaldehyde to urea of 3.0 to 1. The reaction was conducted generally as in Example 2B, until the methanol tolerance observed was about 260% at pH 3.9.

A 3 liter flask was then charged with 1005.8 grams of water, 688.2 grams of urea, and 700 grams of the intermediate reaction product. The pH was adjusted to 3.7 using 8 grams of 10% sulfuric acid.

The temperature of the reaction mixture was raised to 60° C. and held at that temperature for 30 minutes. During this time the pH dropped to 3.5 initially, then rose to 3.9 prior to neutralization. After neutralization, an additional amount of urea, 176.4 grams, was added. As before, the reaction product was divided into two substantially equal parts, Part A and Part B. Both were adjusted in viscosity so that the viscosity of each was in the range from 170 to 190 cps, using a combination of locust bean gum and xanthan gum. As before, Part B was subjected to vacuum stripping to achieve a nitrogen content of 21.5%.

The properties of these two Parts are reported below:

|        | A    | B    |
|--------|------|------|
| % N    | 18.5 | 21.5 |
| % WIN  | 19.9 |      |
| % HWIN | 7.8  |      |
| A.I.   | 61   |      |

After 5 weeks Parts A and B had respective viscosities of 155 and 270 cps. After 4 months, Parts A and B had viscosities of 170 and 760, respectively, and after 6 months, 220 and the consistency of a weak paste. These viscosity values indicated much improved stability in both Parts.

B. Use of an Acid Condensed Intermediate, F/U 2.5 to 1

This demonstration of the invention was made using an intermediate having a molar ratio of formaldehyde to urea of 2.5 to 1. The proportions and procedure otherwise were essentially those of Example 4A above. The characteristics of the two Parts obtained in this manner are reported below:

|        | A    | B    |
|--------|------|------|
| % N    | 18.5 | 20.5 |
| % WIN  | 25.4 |      |
| % HWIN | 11.2 |      |
| A.I.   | 55.9 |      |

After 1 month of storage, Part A had changed little in viscosity but Part B had a viscosity of 1000 cps. This indicates that stability may be decreasing as the F/U molar ratio of the intermediate approaches that of UF resins. After four months, Part A had a viscosity of 420, and after 6 months, Part A was a weak paste.

EXAMPLE 5

Use of Formaldehyde in the Second Stage Reaction Mixture

One of the possible explanations for the improved stability, that is obtained when an intermediate is used in accordance with the present invention is that formaldehyde functionality is much reduced by the use of the intermediate for reaction with urea. This example illustrates that the use of an intermediate in accordance with the invention exerts a stabilizing effect, even when formaldehyde per se is employed in the second stage reaction mixture.

In this example, an intermediate reaction product was prepared following in general the procedure of Example 2B, having a molar ratio of formaldehyde to urea of 3.0 to 1.

This demonstration was conducted on a laboratory scale. A 3 liter flask was charged with 1008.5 grams of water, 723,2 grams of urea, and 104.6 grams of a 50% formaldehyde solution. The pH was then adjusted to 6.6, to prevent any alkaline reaction during the subsequent charging of the intermediate. Then, 560 grams of the intermediate were added to the flask. At this point, the temperature was 31° C. and the pH was 6.6. The pH was adjusted to 3.8 by adding 6.5 grams of 10% sulfuric acid, to start the exothermic reaction to form WIN particles.

The second stage reaction mixture began to react, with the generation of exothermic heat, which raised the temperature of the reaction mixture to 46° C. over a period of about 30 minutes. The temperature was held in the range from about 46° to 48° C. for the next 70 minutes, using cooling. At the end of that time the batch was neutralized with caustic soda to approximately pH 7.0, and cooled to 34° C.-38° C. The reaction at this point was essentially complete. An additional 176.5 grams of urea was then added to increase the overall nitrogen content. The temperature dropped about 5° C. as the urea dissolved.

As in prior examples, the second stage reaction product was divided into two essentially equal parts, A and B respectively. Part B was subjected to vacuum evaporation to increase the overall nitrogen content to 20.5% by eliminating water. Both Parts were thickened to have viscosities in the range from 160 to 170 cps with a combination of locust bean gum and xanthan gum. The two Parts were then subjected to analysis and the following characteristics were observed:

|   | A | B |
|---|---|---|
| N | 18.5 | 20.5 |
| % WIN | 21.2 | |
| % HWIN | 4.2 | |
| A.I. | 80.1 | |

After 6 weeks at room temperature neither Part showed any tendency to increase materially in viscosity. After 46 days, Part B had a viscosity of 170 cps; after 75 days, 500 cps; and shortly thereafter, it developed a weak paste condition. After 6 months, Sample A had increased in viscosity to only 400 cps.

This example demonstrates that when an intermediate is used that has a low degree of aldehyde functionality, then even the use of a free formaldehyde reactant in the second stage reaction mixture does not impair stability.

EXAMPLE 6

Effect of Different Reaction Times at From 45° C. to 50° C.; Use of Dicyandiamide The intermediate was prepared as in Example 2B, to have an F/U molar ratio of 3.0.

For the second stage reaction, in a run designated as Batch X, a 5 liter, 3 neck flask was charged with 1837.24 grams of water, 1229.12 grams of urea, and 44.62 grams of dicyandiamide (D). The pH was adjusted to 6.55 with 30% formic acid. The intermediate, 976.58 grams, was charged along with 182.16 grams of 50% formaldehyde. The temperature was adjusted to 30° C. and 14.5 grams of 10% sulfuric acid was added to adjust to pH 3.75. From this point on the reaction was as follows (no heat required beyond this point):

| Time (minutes) | Temperature °C. | Remarks |
|---|---|---|
| 0 | 30 | Acid added pH 3.75 |
| 13 | 39° C. | Turning turbid pH 3.7 |
| 28 | 45° C. | pH 3.58 |
| 38 | 47° C. | pH 3.55; Viscosity 10 cps, slight cooling |
| 68 | 48° C. | pH 3.67; Viscosity 7 cps, cooling |
| 98 | 47° C. | pH adjusted to 6.8 with 50% sodium hydroxide |

The reaction mixture was permitted to cool. At 38° C., 313.72 grams urea were added. This is Part A. Part B was taken from Part A and stripped to 21% N. Part A was adjusted to 210 cps with xanthan and locust bean gum. Part B was adjusted to 250 cps with xanthan and locust bean gum.

For Batch X, the reaction mixture was held in the temperature range 45° C.–48° C. for a total of 70 minutes. For comparison purposes, two more batches, Y and Z, were made in a similar manner with hold periods at 45° C.–48° C. of 45 and 100 minutes, respectively.

These batches illustrate the effect of hold periods at reaction temperatures below 50° C. on the WIN levels on an 18.5% total N system containing dicyandiamide and where 20% of the total formaldehyde is furnished during the second stage reaction as a 50% solution.

|  | Part A | | |
|---|---|---|---|
| Hold Period @ 45–50° C. | WIN | HWIN | A.I. |
| 70 Minutes (Batch X) | 20.0 | 4.89 | 75.6 |
| 45 Minutes (Batch Y) | 14.3 | 4.0 | 72.0 |
| 100 Minutes (Batch Z) | 19.6 | 6.6 | 66.4 |

Stabilities were as follows:

| | Hold Period | | | | | |
|---|---|---|---|---|---|---|
| | Batch X 70 minutes | | Batch Y 45 minutes | | Batch Z 100 minutes | |
| | Part A | Part B | Part A | Part B | Part A | Part B |
| % N | 18.5 | 21.0 | 18.5 | 21.0 | 18.5 | 21.0 |
| Storage Period | | | | | | |
| 5 months | 180 cps | 850 cps | 220 cps | 650 cps | 170 cps | 900 cps |
| 7 months | 200 cps | 880 cps | 240 cps | 700 cps | 190 cps | 780 cps |

Although the short 45 minute hold period resulted in WIN levels below the 15% minimum desired, little difference was noted in increasing the hold period from 70 to 100 minutes. This illustrates the ease of control over the reaction, when conducted in accordance with the present invention, without fear of a runaway reaction which would result in poor stability at best, with the possibility of the product going pasty in the reaction vessel.

EXAMPLE 7

Demonstration of Stabilization at Higher Nitrogen Contents; Use of Dicyandiamide This example demonstrates the fact that the present invention can be used to prepare very stable systems at nitrogen levels well above 20%.

This demonstration of the invention was also made on a laboratory scale. As an initial step, 698.5 grams of an F/U 3.0 intermediate were prepared, generally as in Example 2B, containing 260.6 grams of formaldehyde and 173.7 grams of urea. The molar ratio of formaldehyde to urea in the intermediate was 3.0, and it was reacted to a methanol tolerance of 250%.

A 3 liter reaction flask was charged with 1021.7 grams of water; 715.6 grams of urea; and 31.9 grams of dicyandiamide (D). The pH was adjusted to 6.6 using 10% sulfuric acid, and all 698.5 grams of the intermediate reaction product were added. Then, 130.3 grams of a 50% formaldehyde solution were added and the temperature was adjusted to 27° C. The reaction ratio of the demonstration was therefore $(U+D)/F = 1.4$. Also, 20% of the total amount of formaldehyde was added during the second stage as a 50% solution.

The pH was then adjusted to 3.82 using 8 grams of 10% sulfuric acid. The reaction progressed as follows:

| Time (Minutes) | |
|---|---|
| 0 | 10% Acid added, pH 3.82 |
| 22 | Temperature 37° C., pH 3.72; material was turbid |
| 35 | Temperature 42° C., pH 3.65 |
| 60 | Temperature 49° C., pH 3.5; vis. 15 cps |
| 75 | Temperature 49° C., pH 3.53; vis. 10 cps |
| 100 | Temperature 49° C., pH 3.63 |

At this point the reaction mixture was permitted to cool. The pH was adjusted to 6.5 by adding a 50% caustic soda solution. Then 190.5 grams of urea were added to increase the nitrogen content.

The reaction product thus obtained was divided into two essentially equal parts, A and B.

The viscosity of Part A was adjusted to 180 cps by adding a combination of locust bean gum and xanthan gum.

Part B was vacuum concentrated to attain a total nitrogen content of 21% by weight based on the weight of the concentrate, then thickened by the addition of xanthan gum and locust bean gum, to a viscosity of 380 cps.

Part B was then divided into two substantially equal portions, one continuing to be labelled Part B, and the other, Part C. A sufficient quantity of urea was then added to Part C to increase the total nitrogen content to 24% by weight. This addition reduced the viscosity to 150 cps.

All three Parts were then submitted to analysis:

|  | A | B | C |
|---|---|---|---|
| Fresh Viscosity, cps | 180 | 380 | 150 |
| % Calculated N | 18.5 | 21.0 | 24.0 |
| % WIN | 25.5 |  | 19.5 |
| % HWIN | 12.6 |  | 8.8 |
| A.I. | 50.4 |  | 55.0 |
| % Free Urea N* | 30.18 |  | 41.73 |
| Viscosity after 4½ Months | 220 | 600 | 280 |
| Viscosity after 6½ Months | 200 | 1,240 | 300 |

*Based on total Nitrogen

The viscosities of all three Parts, after storage for four and one-half months, indicate that all three Parts had very high stability. The results are considered to be quite remarkable.

EXAMPLE 8

All Acid Cooked Intermediate at F/U 3.5

This example illustrates the production of an intermediate at F/U 3.5 without the alkaline methylolation.

To a 5 liter, 3 neck flask was charged 4186.62 grams (69.777 mols) of 50% formaldehyde. The pH was adjusted to 3.75 with 1.1 grams of sodium hydroxide. Urea, a total of 1196.1 grams or 19.935 mols, was added incrementally as follows:

| Time | Temperature | Remarks |
|---|---|---|
| 10:50 | 50° C. | 300 Grams urea charged, pH 3.9, heat applied |
| 11:17 | 80° C. | 200 Grams urea charged, pH 4.0, remove heat |
| 11:23 | 85° C. | 200 Grams urea charged |
| 11:40 | 85° C. | 200 Grams urea charged |
| 11:44 | 86° C. | 100 Grams urea charged |
| 11:50 | 87° C. | 100 Grams urea charged, pH 3.95 |
| 11:55 | 86° C. | 96 Grams urea charged, cool to 80° C. |
| 11:57 | 80° C. | pH 4.0, Methanol tolerance 380% |
| 12:15 | 78° C. | Methanol tolerance 270%, cool, then add 1.6 grams 50% sodium hydroxide to pH 6.6 |

This intermediate had the following physical properties:

| pH | 6.6 |
|---|---|
| Brookfield Viscosity LVF 1/60/25° C. | 21.5 cps |
| Specific Gravity 25/25° C. | 1.218 |
| % Methanol Tolerance | 260 |
| Buffer Capacity | 5.9 mls |

This intermediate was satisfactory for use in second stage reactions leading to the production of stable products.

GENERAL

Several different demonstrations of the production of intermediates have been exemplified. An all acid-side first stage reaction can be used although it is generally preferred to conduct an alkaline methylolation prior to the acid condensation, to prevent the formation of non-resinous fertilizer type compounds. The acid condensation results in the splitting off of water during polymerization. This technique insures clarity of the intermediate. It might be possible to condense the intermediate entirely under alkaline conditions, however, the reaction would be so time consuming as to be economically unattractive. Also the pH tends to drop during the alkaline reaction at elevated temperatures, particularly in the presence of large amounts of free formaldehyde, thus incremental additions of alkali would be required throughout the reaction. Thus the acid condensation step in the first stage reaction is considered to be a practical necessity to insure stability of the intermediate, i.e., maintenance of a water clear reaction product which will not contain precipitated reaction material even after storage for a year or more at ordinary room temperature (i.e. about 20° C.). It is the combination of a proper F/U molar ratio and acid (or alkaline/acid) reaction which deactivates the formaldehyde, thus allowing greater control of manufacture of the second stage material and its increased stability. Generally this means that the F/U molar ratio of the intermediate should be 4.7 or lower to 1, and preferably, 4.5 or lower to 1, down to about 2.5 to 1.

At F/U 3.5, a 600% methanol tolerance denotes adequate reaction for stability. At F/U 3.0, the intermediate at 600% methanol tolerance would gradually turn cloudy and develop a sediment layer, therefore, as Example 2B illustrates, further reaction to a lower methanol tolerance and higher viscosity is desirable.

When an all acid cook is employed in the manufacture of the intermediate, it is advisable to react to a lower methanol tolerance at any F/U ratio as compared to an intermediate alkaline/acid reaction. Example 8 illustrates an all acid reaction carried on to a methanol tolerance of 260%. When reacted to a methanol tolerance of 430%, the material did not remain clear and a sediment layer gradually developed. Although the latter intermediate could be used to make a second stage material, the intermediate would have to be stored in a tank fitted for agitation to maintain its uniformity.

The use of dicyandiamide in the second stage appears to result in a stabilizing effect attributable to the dicyandiamide. Its use is therefore favored.

Many lawn applicators wish to apply liquid fertilizer solutions containing only nitrogen. The foregoing examples demonstrate the production of suitable solutions for this purpose. Flowable liquid urea formaldehyde fertilizer solutions can be prepared in accordance with the invention that are sufficiently stable to permit storage in underground tanks during the season and between seasons, despite the absence of any equipment that would facilitate removal of gelled solutions. However, periodic circulation of the material is a wise precaution to insure uniformity during long storage periods. Generally, though, it is an important advantage of the invention that when the techniques of the present invention are used, the fertilizer solutions may be safely stored between seasons in tanks without heating coils or easy access to facilitate the removal of very thick or gelled materials. This is of primary importance to lawn applicators.

The examples above demonstrate the production of nitrogenous base solutions from which fertilizer solutions can be formulated. Alternatively, by adjusting concentrations to meet desired specification for nitrogenous flowable liquid fertilizer solutions, the nitrogenous base solutions of the examples may be used per se.

When a balanced fertilizer solution is desired, that is, one containing phosphorus and potassium values as well as nitrogen, it is a simple matter to add appropriate amounts of the salts of phosphorus and potassium such as ammonium polyphosphate and potassium chloride. When the fertilizer base has been stabilized by the addition of gum, some precautions must be taken for the formulation of balanced fertilizer solutions. Gums will not effectively dissolve in a system containing salts of phosphorus and potassium. Accordingly, the gums should be added first, and the salts of phosphorus and potassium should be added only after the gums have been dissolved. A combination of xanthan gum and guar gum is preferred over xanthan gum and locust bean gum for systems containing phosphorus and potassium.

For lawn applications, a balanced fertilizer solution has been made up containing 16.5% nitrogen; 2.0% phosphorus as $P_2O_5$; and 5.0% potassium as $K_2O$, stabilized with a gum. Stabilization has been effected with xanthan gum alone; with a mixture of xanthan gum and underivatized guar gum; and a mixture of xanthan gum with derivatized guar gum. Generally greater stability was attained either through the use of xanthan gum alone, or through the use of a combination of xanthan gum with underivatized guar gum, for suspending water insoluble nitrogen particles in a complete NPK fertilizer system. In the formulations just discussed, the phosphorus content was derived from ammonium polyphosphate and the potassium content from potassium chloride.

It is often convenient to neutralize the second stage reaction mixture with a solution of sodium hydroxide or potassium hydroxide. However, ammonia is also convenient to use and in addition, contributes to the nitrogen values present.

While the flowable fertilizer solutions exemplified herein rely upon urea primarily for their basic nitrogen content, other nitrogen sources may be present. In particular, any final adjustment of a nitrogen source, after the reaction has been concluded, may constitute some material other than urea, such as, for example, ammonium nitrate, ammonium sulfate, or even just ammonia.

Moreover, solutions prepared in accordance with the invention can include micronutrients such as, for example, the following elements in the form of their water-soluble salts: boron, iron, cobalt, copper, mangenese, molybdenum, nickel and zinc. Since salts of some of these materials or other trace elements that might be added may tend to have a precipitating action on one or more of the materials used in the formulation, an evaluation of several different gum combinations is advisable whenever the fertilizer solution is formulated to provide one or more nutrients other than nitrogen.

When a fertilizer composition prepared in accordance with this invention is sprayed on grass, for example, the individual blades of grass may become coated with fine particles of polymeric solids, as the aqueous vehicle evaporates. To facilitate redispersion of these particles when they again come in contact with rain water or water applied by a sprinkler system, it is desirable to incorporate a surfactant in the fertilizer formulation. Nonionic surfactants are preferred for this purpose.

While the invention has been disclosed in this patent application by reference to the details of preferred embodiments of the invention, it is to be understood that this disclosure is intended in an illustrative rather than in a limiting sense, as it is contemplated that modifications will readily occur to those skilled in the art, within the spirit of the invention and the scope of the appended claims.

What is claimed is:

1. A two stage process for preparing an aqueous dispersion of a urea-formaldehyde condensation product comprising:
   in a first stage, reacting together formaldehyde and urea in a molar ratio of formaldehyde to urea in the ratio from about 2.5 to 1 to about 4.7 to 1 in the presence of a condensation catalyst until the methanol tolerance is in the range from about 150% to about 800%, to form an intermediate reaction product, then
   in a second stage, reacting said intermediate reaction product with an additional amount of urea such that the overall molar ratio of urea to formaldehyde is in the range from 0.8 to 1 to about 1.7 to 1, at an acid pH and at an elevated temperature not above about 70° C., until the amount of water insoluble nitrogen present in the reaction mixture is in the range from about 15% to about 35% based on the total amount of nitrogen in the system.

2. The process of claim 1 wherein the pH throughout the first stage reaction is on the acid side.

3. The process of claim 2 wherein the molar ratio of formaldehyde to urea in the first stage reaction is in the range from about 3 to 1 to about 3.5 to 1.

4. The process of claim 1 wherein the pH during the first stage is initially alkaline so that the urea is methylolated, then acidic so that the reaction proceeds by condensation, with the elimination of water.

5. The process of claim 3 or 4 wherein the first stage reaction temperature is in the range from about 60° C. to reflux temperature.

6. The process of claim 5 wherein the intermediate reaction product produced by the first stage reaction has a methanol tolerance of about 260% or greater.

7. The process of claim 5 wherein the second stage reaction conditions are such that the water insoluble nitrogen content of the second stage reaction product is in the range from about 20% to about 30% by weight based on total available nitrogen in the second stage reaction product.

8. The process of claim 5 wherein the activity index of the second stage reaction product is in the range from about 50 to 95.

9. The process of claim 7 wherein the amount of total nitrogen in the second stage reaction product is in the range from about 15% to about 18% by weight based on the reaction product.

10. The process of claim 9 wherein the initial reactants of the second stage of the process include up to 5% by weight of dicyandiamide based on total solids in the second stage reaction mixture.

11. The process of claim 9 wherein up to 50% of the total amount of formaldehyde in the reaction product in the second stage of the process is derived from formaldehyde supplied to the second stage as a reactant, in the form of an aqueous solution at a concentration in the range from about 37% to about 55% by weight.

12. A two stage process for preparing an aqueous dispersion of a urea-formaldehyde condensation product comprising:

in a first stage, reacting together formaldehyde and urea in a molar ratio of formaldehyde to urea in the ratio from about 2.5 to 1 to about 4.5 to 1 in the presence of an alkaline catalyst to methylolate the urea then reacting the material further at an acid pH until the methanol tolerance is in the range from about 150% to about 800%, to form an intermediate reaction product, then in a second stage, reacting said intermediate reaction product with an additional amount of urea such that the overall molar ratio of urea to formaldehyde is in the range from 0.8 to 1 to about 1.7 to 1, at an acid pH and at an elevated temperature not above about 70° C., until the amount of water insoluble nitrogen present in the reaction mixture is in the range from about 15% to about 35% based on the total amount of nitrogen in the system.

13. The process of claim 12 wherein the molar ratio of formaldehyde to urea in the first stage reaction is in the range from about 3 to 1 to about 3.5 to 1.

14. The process of claim 13 wherein the pH in the first stage acid reaction is in the range from 3.5 to 5.5.

15. The process of claim 14 wherein the first stage reaction temperature is in the range from about 60° C. to reflux temperature.

16. The process of claim 15 wherein the intermediate reaction product produced by the first stage reaction has a methanol tolerance of about 600%.

17. The process of claim 15 wherein the second stage reaction conditions are such that the water insoluble nitrogen content of the second stage reaction product is in the range from about 20% to about 30% by weight based on total available nitrogen in the second stage reaction product.

18. The process of claim 17 wherein the activity index of the second stage reaction product is in the range from about 50 to 95.

19. The process of claim 18 wherein the amount of total nitrogen in the second stage reaction product is in the range from about 15% to about 18% by weight based on the reaction product.

20. The process of claim 19 wherein the initial reactants of the second stage of the process include up to 5% by weight of dicyandiamide based on total solids in the second stage reaction mixture.

21. The process of claim 19 wherein up to 50% of the total amount of formaldehyde in the reaction product in the second stage of the process is derived from formaldehyde supplied to the second stage as a reactant, in the form of an aqueous solution at a concentration in the range from about 37% to about 55% by weight.

22. A two stage process for preparing an aqueous dispersion of a urea-formaldehyde condensation product comprising:

in the first stage, reacting together formaldehyde and urea in a molar ratio of formaldehyde to urea in the range from about 3 to 1 to about 3.5 to 1, in the presence of an alkaline catalyst at an elevated temperature for a sufficient time to cause methylolation to occur, then continuing said reaction at an acid pH in the range from about pH 3.5 to about pH 5.5 at a temperature in the range from 60° C. to reflux, until the first stage reaction product exhibits a methanol tolerance in the range from about 500% to about 700%, then in the second stage, reacting the first stage reaction product with an additional amount of overall urea so that the urea to formaldehyde molar ratio is in the range from about 1.4 to 1 to about 1.7 to 1, at an acid pH and at an elevated temperature not above about 70° C., to achieve a level of water insoluble nitrogen in the second stage reaction product in the range from about 20% to about 30% by weight based on total nitrogen present, and an activity index in the range from about 65 to about 85, the total nitrogen content of the second stage final product being in the range from about 15% to about 18% by weight based on the total reaction product.

23. The process of claim 22 wherein the reactants for the second stage include dicyandiamide in an amount up to 5% by weight based on total solids present, dry basis.

24. The process of claim 22 wherein up to 50% of the formaldehyde supplied initially to the second stage as a reactant is supplied as an aqueous solution at a concentration in the range from about 37% to about 55%.

25. The process of claim 22 wherein the acid catalyzed reaction in the first stage is permitted to progress to the point where the methanol tolerance of the first stage reaction product is about 600%.

26. The process of claim 22 or 25 in which the reaction temperature in the second stage is not above 50° C.

27. The process of claim 22 or 25 wherein the second stage reaction product is formulated for fertilizer use by the addition of urea to adjust the total nitrogen content in the formulation to from about 17% to about 25% by weight based on the formulation.

28. The process of claim 27 wherein the formulation is adjusted in viscosity by the addition of a gum, so that the viscosity as measured on a Brookfield Viscometer Model LVF, spindle 2, at 30 rpm and 25° C., is in the range from about 150 cps to about 300 cps.

29. A product comprising the dispersion prepared by the process of claim 1, 4, 12, 16, 19 or 22.

30. An aqueous dispersion of a urea-formaldehyde condensation product having a molar ratio of urea to formaldehyde in the range from about 0.8 to 1 to about 1.7 to 1, in which at least 50% of the formaldehyde content of the product is supplied by a condensation product of urea and formaldehyde having a methanol tolerance in the range from about 150% to about 800%, and such that the condensation product is clear and will remain clear and substantially free from precipitated reaction material, upon storage for one year at room temperature, said dispersion being further characterized by having a viscosity in the range from about 150 cps to about 300 cps, as measured on a Brookfield Viscometer Model LVF, spindle 2, at 30 rpm and 25° C., which viscosity is stable at a temperature in the range from about 50° F. to 90° F. (10° C. to 32° C.) for at least four months when the nitrogen content of the product is in the range from about 17% to about 19% and at least two months when the total nitrogen content of the product is in the range from about 19% to about 25% by weight based on total product.

31. An aqueous dispersion of a urea-formaldehyde condensation product having a molar ratio of urea to formaldehyde in the range from about 0.8 to 1 to about 1.7 to 1, in which at least 50% of the formaldehyde content of the product is supplied by a condensation product of urea and formaldehyde that has been alkaline methylolated and then acid reacted until the methanol tolerance is in the range from about 150% to about 800%, said dispersion being further characterized by having a viscosity in the range from about 150 cps to about 300 cps, as measured on a Brookfield Viscometer Model LVF, spindle 2, at 30 rpm and 25° C., which viscosity is stable at a temperature in the range from about 50° F. to 90° F. (10° C. to 32° C.) for at least four months when the nitrogen content of the product is in the range from about 17% to about 19% and at least two months when the total nitrogen content of the product is in the range from about 19% to about 25% by weight based on total product.

32. The product of claim 31 which may contain, in reacted form therein, up to 5% by weight of total solids, dry basis, of dicyandiamide.

* * * * *